United States Patent [19]

Metcalfe et al.

[11] Patent Number: 5,764,862

[45] Date of Patent: Jun. 9, 1998

[54] NEAR WHITE COLOR CORRECTION

[75] Inventors: James Robert Metcalfe; Kia Silverbrook, both of New South Wales, Australia

[73] Assignee: Canon Kabushiki Kaisha, Tokyo, Japan

[21] Appl. No.: 570,742

[22] Filed: Dec. 12, 1995

Related U.S. Application Data

[63] Continuation of Ser. No. 204,070, Mar. 2, 1994, abandoned.

[30] Foreign Application Priority Data

Mar. 8, 1993 [AU] Australia ................... PL7676

[51] Int. Cl.⁶ ................................. G06F 15/00
[52] U.S. Cl. ................................. 395/102; 395/109
[58] Field of Search ................... 395/102, 110, 395/114, 117, 111, 109, 126, 127, 128, 121, 131

[56] References Cited

U.S. PATENT DOCUMENTS

| | | | |
|---|---|---|---|
| 5,121,468 | 6/1992 | Daino | 395/102 |
| 5,123,082 | 6/1992 | Shimada | 395/102 |
| 5,271,095 | 12/1993 | Yamada | 395/128 |
| 5,299,294 | 3/1994 | McCracken et al. | 395/110 |
| 5,315,693 | 5/1994 | Hirosawa | 395/128 |
| 5,317,678 | 5/1994 | Okawara et al. | 395/126 |
| 5,325,471 | 6/1994 | Inoue | 395/127 |
| 5,341,464 | 8/1994 | Friedman et al. | 395/131 |
| 5,394,518 | 2/1995 | Friedman et al. | 395/131 |
| 5,398,120 | 3/1995 | Friedman et al. | 358/501 |

*Primary Examiner*—Raymond J. Bayerl
*Assistant Examiner*—Steven P. Sax
*Attorney, Agent, or Firm*—Fitzpatrick, Cella, Harper & Scinto

[57] ABSTRACT

In a color image processing system (1), near-white color corrections are performed prior to printing (8) to improve the dynamic range of the printed image. Input pixels are compared with a threshold (71) and if less than, a dithering is performed to determine the output value. Dithering takes place to determine if the output value is to be the threshold or zero.

12 Claims, 5 Drawing Sheets

5,764,862

NEAR WHITE COLOR CORRECTION

This application is a continuation of application Ser. No. 08/204,070 filed Mar. 2, 1994 now abandoned.

The present invention relates to the display of color images on a display device and in particular, the display of color images containing areas near-white in color by a color printing device.

BACKGROUND TO THE INVENTION

Images are normally displayed by a CRT type display using an additive format such as in an Red, Green, Blue (RGB) format. In this format separate color information is provided for each of the Red, Green and Blue primary colors and when displayed together, they form any desired color to be displayed.

However, when it is desired to print out a color representation of the image displayed by a color printing device, a subtractive color format is used. One such subtractive format is the Cyan, Magenta, Yellow and Black format (CMYK). Such a subtractive format is commonly used in color printing device and in particular is used in Canon CLC 500 color laser printer manufactured by Canon Inc.

A color conversion apparatus is needed to convert the RGB format into the CMYK format. However, the display of color images in the CMYK format presents a number of problems when printing portions of a display near white values.

One such problem is that the printer may have an insufficient number of discrete toner levels near white as well as poor linearity when only small amounts of toner are present. This can lead to the production of noticable 'bands' when printing color blends that increase or decrease slowly in at least one color component as well as a loss of detail in images that are close to white. Many colors which are close to white are effectively saturated to white.

SUMMARY OF THE INVENTION

In accordance with the present invention there is disclosed a method for improving the perceptible dynamic range of a color image printed on an output device comprising:

detecting those image values that are substantially close to white and dithering said image values.

BRIEF DESCRIPTION OF THE DRAWINGS

A preferred embodiment of the present invention will now be described with reference to the accompanying drawings in which.

DETAILED DESCRIPTION OF THE PREFERRED EMBODIMENT

Figure 1:
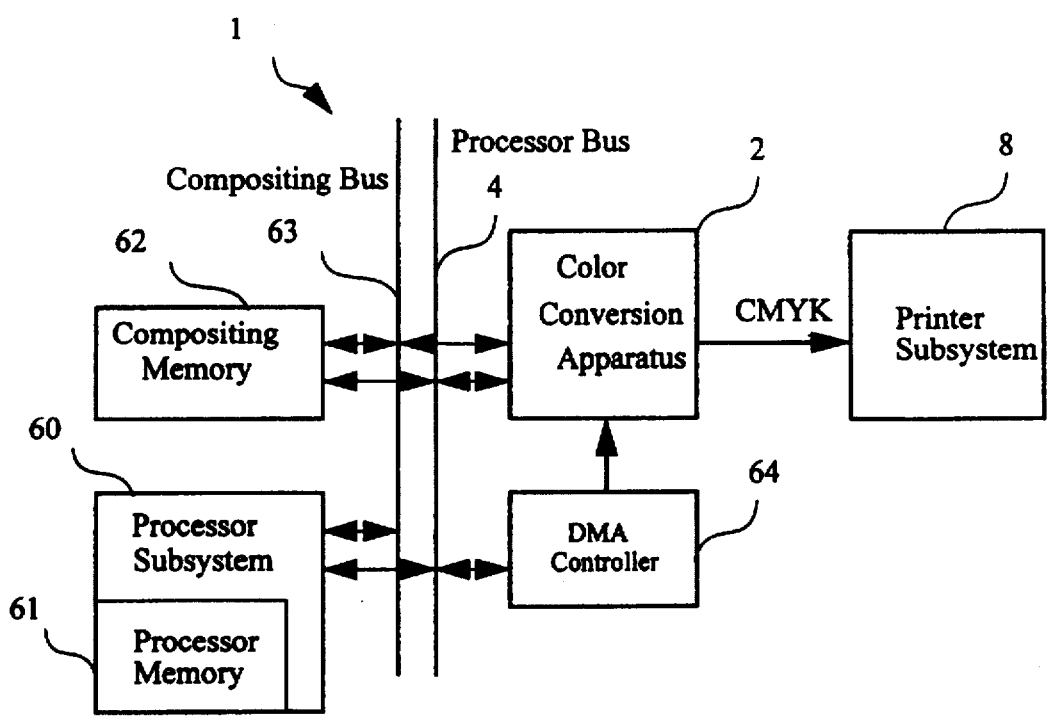
FIG. 1 illustrates a color processing system incorporating the preferred embodiment of the present invention.

FIG. 1 shows a color conversion apparatus 2 designed to form part of a color image processing system 1 similar to that set out in Australian Patent Application No. 81782/91 of 16 Aug. 1991 (Attorney Ref: (Page+2)(186264)). However, applications of the present embodiment are not limited thereto.

FIG. 1 shows a simplified block diagram of the color image processing system 1 used in a typical application, and configured to operate on a standard computer system. The color conversion apparatus 2 interacts with two main subsystems:

The first is a processor subsystem 60, which includes in particular a processor memory 61. Color conversion tables required for each color pass are established in the processor memory 61. The color image processing system 1 loads the color conversion table required for each color pass (C, M, Y or K) at the beginning of a conversion pass. These can be loaded either via normal write cycles to the processor memory 61 or under control of a DMA master controller 64. Adjunct to the processor subsystem 60 is a compositing memory 62 and a corresponding compositing bus 63.

The second is a printer subsystem 8. The C,M,Y or K value resulting from interpolating the color conversion table by the color conversion apparatus 2 will be output to the printer subsystem 8 by the color conversion apparatus 2.

Processor input/output (I/O) to and from the color conversion apparatus 2 is performed by processor bus interface subsystem 3 via a processor bus 4 in synchronization with the processor clock. I/O to and from the printer subsystem 8 is synchronized with the pixel clock of the relevant printer subsystem. An example of the printer subsystem 8 for use with the preferred embodiment of the present invention is Canon's CLC500 color printer.

Figure 2:
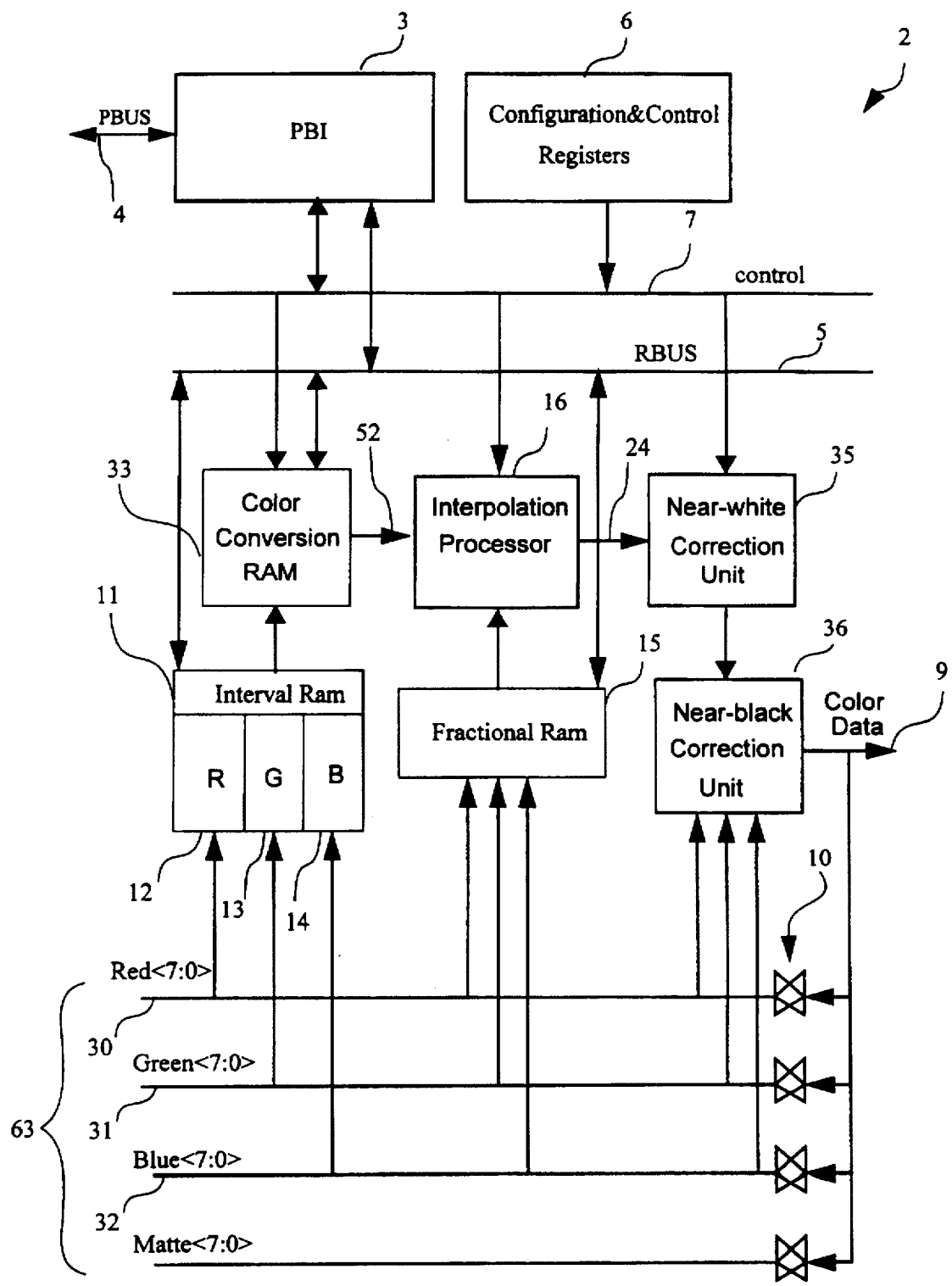
FIG. 2 illustrates a color conversion apparatus incorporating the preferred embodiment of the present invention.
Figure 3:
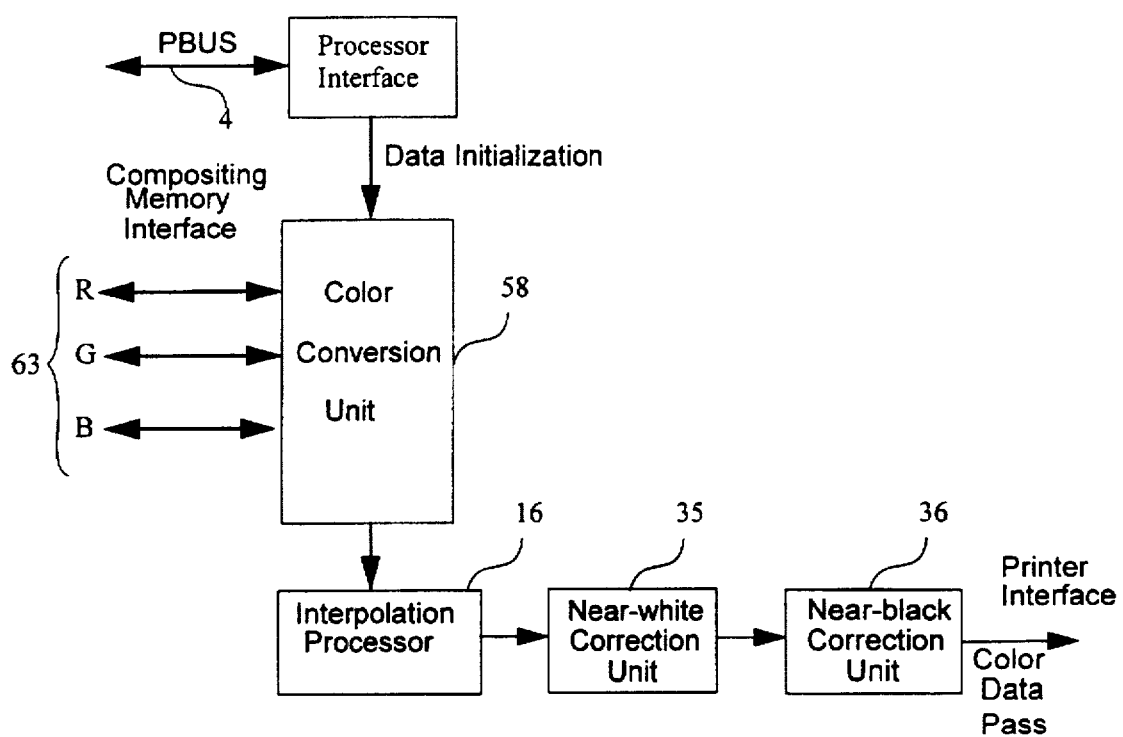
FIG. 3 illustrates the execution pipeline of the color conversion apparatus of FIG. 2.

FIG. 2 shows schematically the structure of the color conversion apparatus 2, the data flow of which is shown in FIG. 3.

The modules in color conversion apparatus 2 form a processing pipeline which accept a stream of RGB pixel data from the compositing bus 63 and pass it along the processing pipeline to generate the appropriate color conversion data for output to the printer interface.

The color conversion apparatus 2's interface to the processor bus 4 is controlled by the processor bus interface subsystem 3. The processor bus interface subsystem 3 interfaces the processor bus 4 to an internal register bus 5 for register read and write cycles, and processor DMA accesses to internal RAM within the color conversion apparatus 2.

Configuration and control of color conversion apparatus 2 is achieved by reading and writing internal configuration and control registers 6 of the color conversion apparatus 2 which generates control information 7 from those registers for the color conversion apparatus 2.

Each of the internal memories are dual ported (not necessarily physically but functionally by means of the processor mode bit in the configuration and control registers 6), with a port assigned to the execution pipeline of the color conversion apparatus 2 and a port assigned to the register bus 5. The port assigned to the register bus 5 is used for the loading of each internal memory before each color pass of the printer subsystem 8.

Three distinct operations are performed by color conversion apparatus 2, those being color conversion, near-white correction performed by a near-white correction unit 35, and text detect edge enhancement performed by a near-black correction unit 36. The resulting output data 9 is the RGB to CMYK color conversion required by the relevant printing device.

The output data 9 can be returned back to the compositing memory 62 by an arrangement of bi-directional buffers 10.

In FIG. 3, the execution pipeline of the color image processing system 1, in which three distinct operations are performed therein. Color conversion is performed by a color conversion unit 58 and interpolation unit 4, near-white processing is performed by near-white processing unit 5 and near-black processing is performed by the near-black processing unit 6.

The color conversion unit 58 represents a combination of a color conversion RAM 33, a non-uniform color space conversion interval RAM 11, and an interpolation processor 16 which perform the color conversion from the RGB format to the CMYK format. The near-white correction unit 35 then performs near-white color correction on the output so as to extend the dynamic range of an output device such as a printer when printing colors near-white. The output is then passed through the near-black correction unit 36 before being passed to the printer interface for printing.

Figure 4:
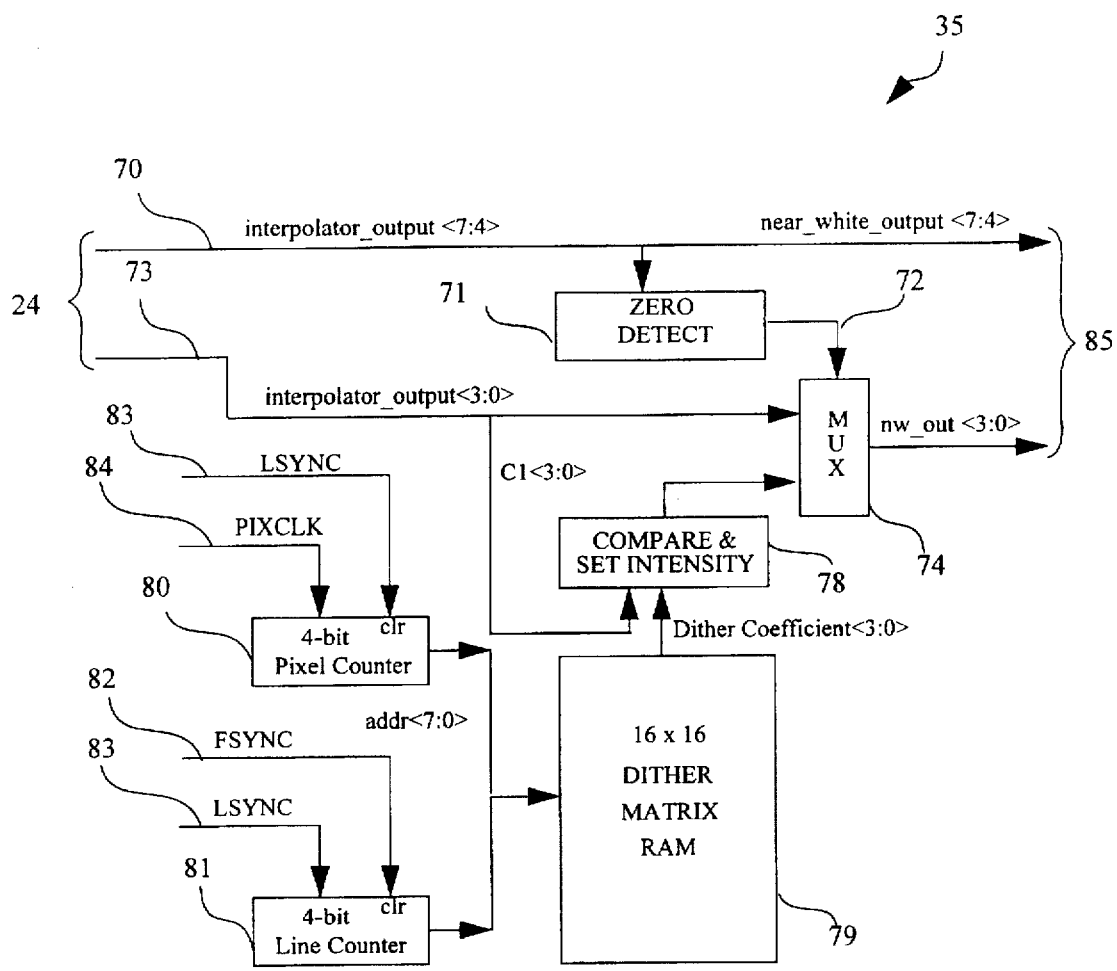
FIG. 4 is a schematic block diagram of the preferred embodiment of the present invention.

Referring now to FIG. 4, there is shown the structure of the near-white correction unit 35. The upper 4 bits of color conversion data 70 output of the interpolation processor 16 are used for input to a zero detection unit 71 which is used to detect possible near white values and outputs a multiplexor selection signal 72 which is used by mulitplexor 74 to select the lower four bits of output.

The near-white correction unit 35 uses the process of dithering for values in the range of intensities from 0 to 0×0F to increase the perceived dynamic range on the printed output.

In the process of dithering an image, the decision to intensify a particular output location is made dependent on the desired intensity S(x,y) at that particular point and on a predetermined dither matrix value D(i,j). To display the required point at O(x,y), it is necessary to generate i=x modulo n  (EQ 1)

j=y modulo n  (EQ 2)

Then, if S(x,y)>D(ij), the point at O(x,y) is intensified, otherwise it is not.

Figure 5:
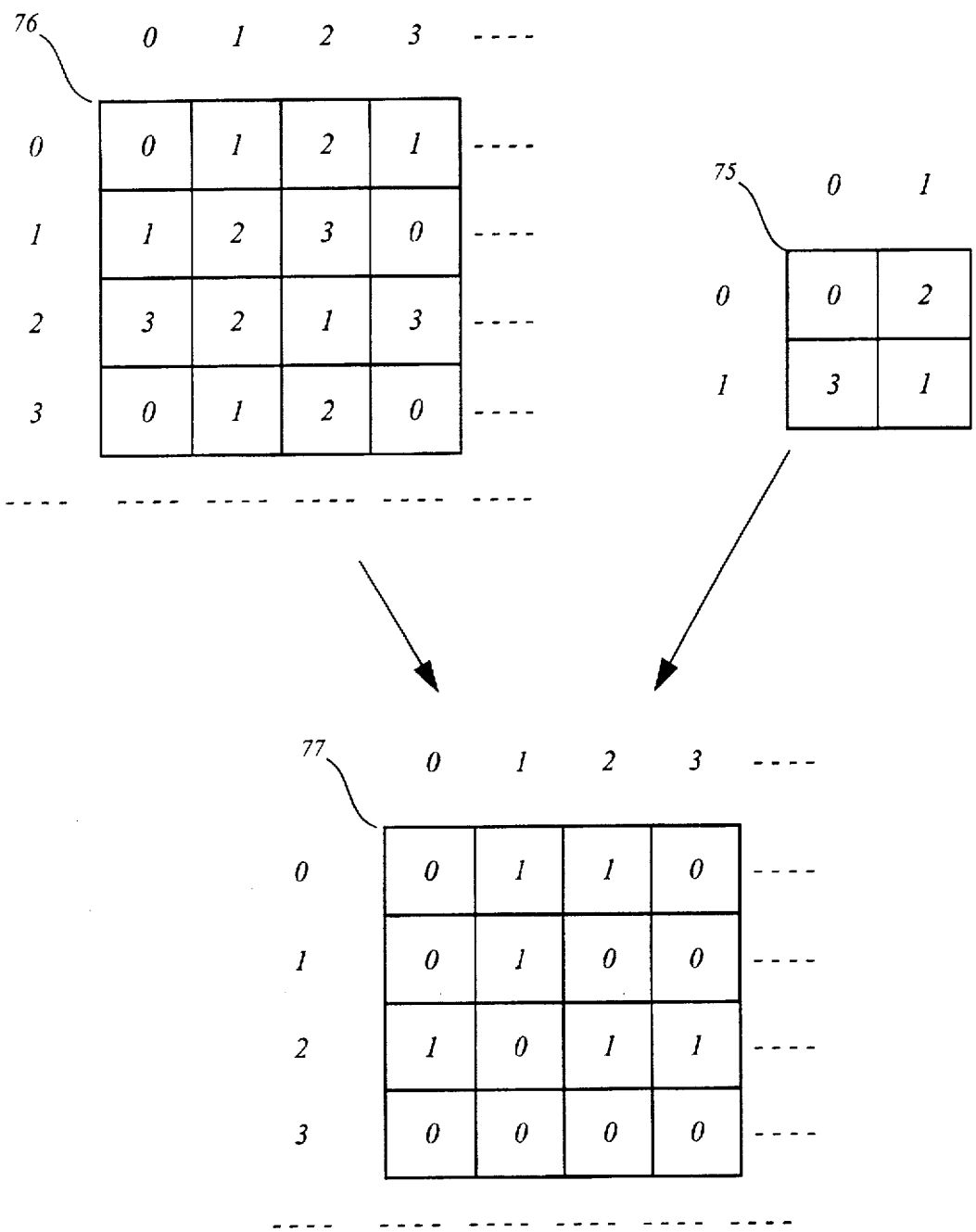
FIG. 5 is an illustration of an example of the dithering process used in the preferred embodiment.

Referring now to FIG. 5, there is shown an example of the dithering process using a 2×2 dither matrix values 75. The input matrix values 76 containing S(x,y), and dither matrix values 75 having locations D(i,j), are used in conjunction with the above intensification rule to produce output matrix values 77 O(x,y) with 0 corresponding to those points that are not intensified, and 1 corresponding to those points that are intensified. Hence, input position S(0,0) with a value of 0, will be compared with D(0,0) which has a value 0 also, and the comparison determination is not satisfied, so the point O(0,0) will not be intensified. Input element S(2,3) with a value of 3, will be matched with dither matrix element D(0,1) since 2 modulo 2=0 and 3 modulo 2=1. D(0,1) has a value 2, so the output element O(2,3) is intensified and so on.

The above example is a sample operation of a dither matrix of size 2×2 elements, for a on or off output. In the preferred embodiment of the present invention, a dither matrix of size 16×16 is used.

The near-white correction unit 35 takes the output from the interpolation processor 16 and dithers points with an intensity that is less than or equal to a near-white threshold, 0×0F. If the upper 4 bits of color conversion data 70 correspond to a value greater than the near-white threshold, the zero detection unit 71 outputs a multiplexor selection signal 72 such causes the mulitplexor 74 to pass the input data unhindered. Otherwise, the zero detection unit 71 output causes the output to be the value provided by the comparison unit 78. The lower 4 bits of input data 73 from the interpolation processor 16 is input to a comparison unit 78 which tests if this data is greater than the dither matrix value fetched from a dither matrix RAM 79. If it exceeds the dither threshold then the near-white threshold value is output from a register within the comparison unit 78. If the lower 4 bits of input data 73 is less than or equal to the dither matrix value, then the comparison unit 78 outputs a zero 00 value.

The value output from dither matrix RAM 79 is determined by input index values that are themselves constructed from a 4 bit pixel counter 80 and a 4 bit line counter 81. These counters are maintained to track a pixel's position in the dither matrix.

The 4 bit line counter 81 can be reset at a frame start by a FSYNC signal 82 and counts LSYNC signal 83 pulses. The 4 bit pixel counter 80 can be reset at the line start by the LSYNC signal 83 and will count PIXCLK 84 pulses.

The near-white correction unit 35 provides a near-white output 85 having its four most significant bits obtained from the upper 4 bits of color conversion data 70 output from the interpolation processor 16, and its four least significant bits obtained from an output of the mulitplexor 74.

The forgoing describes only one embodiment of the present invention and modifications, obvious to those skilled in the art can be made thereto without departing from the scope of the present invention.

What we claim is:

1. A method of improving the perceptible dynamic range of a color image comprising a plurality of pixels intended for color reproduction by a color reproduction device using a plurality of colors that form a subtractive color format, said method comprising the steps of:

detecting those pixels which have an intensity value within a predetermined range of intensities of a white intensity value; and dithering the detected pixels prior to color reproduction of the dithered pixels by the color reproduction device.

2. A method as claimed in claim 1, wherein said detection comprises the step of outputting for printing first pixels having an intensity value in excess of a near white threshold value.

3. A method as claimed in claim 2, wherein said election further comprises, for second pixels each having an intensity value less than said near white threshold value, comparing the intensity values of said second pixels with a dither value.

4. A method as claimed in claim 3 wherein if the value of the second pixels is less than said dither value, a zero value is output for printing, and if the value of the second pixels is greater than said dither value, said near white threshold value is output for printing.

5. A method as claimed in claim 4 wherein said dither value is determined using pixel and line counter values derived from a print location in the image of the pixel being printed.

6. An apparatus for improving the perceptible dynamic range of a color image comprising a plurality of pixels intended for color reproduction by a color reproduction device using a plurality of colors that form a subtractive color format, said apparatus comprising:

first comparator means for comparing the intensity value of each pixel of the image with a predetermined threshold value to determine if the intensity value is near white in intensity;

second comparator means for determining if the intensity value of said pixel is greater than a dithered value, and if so, outputting from said second comparator means said predetermined threshold value, and if not, outputting from said second comparator means a zero intensity value, and selecting means for selecting for output from said apparatus the output of said second comparator means if a result of the determination of said first comparator means is negative, and for outputting said pixel value if the result of the determination of said first comparator means is positive.

7. A color image processing apparatus for processing color image data comprising a plurality of pixels for color reproduction by a color reproduction device using a plurality of colors that form a subtractive color format, said apparatus performing dither processing of the color image data prior to color reproduction, said apparatus comprising:

detecting means for detecting those pixels which have an intensity value within a predetermined range of intensities of a white intensity value; and selecting means for selecting between a first mode for outputting first color image data by dither processing the detected pixels and a second mode for outputting the non-detected pixels.

8. A method for providing improved color reproduction of an image reproduced by a color reproduction device using a plurality of colors that form a subtractive color format, said method comprising the steps of:

generating the image in a color space for output by the color reproduction device, wherein the image is to be reproduced on a substantially white media; and for each image value of the image, performing the substeps of:

comparing the intensity of each image value of the image with a predetermined threshold to determine if the image value is near white in intensity, passing the image value directly to the color reproduction device for reproduction on the media when the image value does not satisfy the threshold value, and dithering the image value when the image value does satisfy the threshold value and providing the dithered image value to the color reproduction device for reproduction on the media, wherein the dynamic range of color reproduction by the color reproduction device is extended for near-white color reproduction on the substantially white media.

9. A method as claimed in claim 8, wherein said detection comprises the step of outputting for printing first image values in excess of a near white threshold value.

10. A method as claimed in claim 9, wherein said detection further comprises, for second image values less than said near white threshold value, comparing said second image values with a dither value.

11. A method as claimed in claim 10 wherein if said second image value is less than said dither value, a zero value is output for printing, and if said second image value is greater than said dither value, said near white threshold value is output for printing.

12. A method as claimed in claim 11 wherein said dither value is determined using pixel and line counter values derived from a print location in the image of the pixel being printed.

* * * * *

UNITED STATES PATENT AND TRADEMARK OFFICE
CERTIFICATE OF CORRECTION

PATENT NO. : 5,764,862
DATED : June 9, 1998
INVENTOR(S) : JAMES R. METCALFE ET AL.

It is certified that error appears in the above-identified patent and that said Letters Patent is hereby corrected as shown below:

COLUMN 1 line 12,   "an" (second occurrence) should read --a--.

COLUMN 3 line 1,    "In Fig. 3" should read --Fig. 3 shows--;
    line 39,   "D(ij)," should read --D(i,j),--; and
    line 65,   "such" should read --which--.

COLUMN 4 line 42,   "election" should read --detection--.

UNITED STATES PATENT AND TRADEMARK OFFICE
CERTIFICATE OF CORRECTION

PATENT NO. : 5,764,862

DATED : June 9, 1998

INVENTOR(S) : JAMES R. METCALFE ET AL.

It is certified that error appears in the above-identified patent and that said Letters Patent is hereby corrected as shown below:

COLUMN 6 line 14,   "claim 8" should read --claim 7--; .
   line 21,   "claim 10" should read --claim 10,--; and
   line 27,   "claim 11" should read --claim 11,--.

Signed and Sealed this

Seventeenth Day of August, 1999

Attest:

Q. TODD DICKINSON

*Attesting Officer*      *Acting Commissioner of Patents and Trademarks*